US010247217B2

(12) United States Patent
Pauzus, Jr.

(10) Patent No.: US 10,247,217 B2
(45) **Date of Patent: *Apr. 2, 2019**

(54) DISCONNECT HOUSING FOR USE IN AUTOMATION SYSTEMS

(71) Applicant: BILSING AUTOMATION NORTH AMERICA, INC., Roseville, MI (US)

(72) Inventor: Benjamin Pauzus, Jr., Clinton Township, MI (US)

(73) Assignee: BILSING AUTOMATION NORTH AMERICA, INC., Roseville, MI (US)

( * ) Notice: Subject to any disclaimer, the term of this patent is extended or adjusted under 35 U.S.C. 154(b) by 558 days.

This patent is subject to a terminal disclaimer.

(21) Appl. No.: 15/149,803

(22) Filed: May 9, 2016

(65) Prior Publication Data

US 2016/0252123 A1 Sep. 1, 2016

Related U.S. Application Data

(63) Continuation of application No. 13/700,576, filed as application No. PCT/US2011/038341 on May 27, 2011, now Pat. No. 9,334,892.

(60) Provisional application No. 61/349,496, filed on May 28, 2010.

(51) Int. Cl.
*F16B 17/00* (2006.01)
*B25H 1/00* (2006.01)

(52) U.S. Cl.
CPC ........... *F16B 17/00* (2013.01); *B25H 1/0021* (2013.01); *Y10T 403/20* (2015.01)

(58) Field of Classification Search
CPC .... B25H 1/0042; B25H 1/0021; B25H 1/005; B23Q 3/00; B23Q 3/06; B23Q 3/064
See application file for complete search history.

(56) References Cited

U.S. PATENT DOCUMENTS

| | | | |
|---|---|---|---|
| 2,905,427 | A | 9/1959 | Roeder, Jr. |
| 3,222,053 | A | 12/1965 | Severdia |
| 3,391,606 | A | 7/1968 | Kaminga |
| 3,738,206 | A | 6/1973 | Parsons |
| 3,911,767 | A | 10/1975 | Myers |
| 4,887,927 | A | 12/1989 | Bond |
| 5,214,989 | A | 6/1993 | Giannetti |
| 6,116,399 | A | 9/2000 | Drexl et al. |

FOREIGN PATENT DOCUMENTS

| | | |
|---|---|---|
| DE | 100 200 | 8/1970 |
| EP | 1219839 | 3/2004 |

OTHER PUBLICATIONS

U.S. Appl. No. 13/700,576, filed May 27, 2011.

*Primary Examiner* — Michael P Ferguson
(74) *Attorney, Agent, or Firm* — Barnes & Thornburg LLP

(57) ABSTRACT

A disconnect housing for selectively receiving a tooling boom is disclosed. The disconnect housing is configured with a sensor to indicate when a predetermined amount of force sufficient to retain the tooling boom therein has been applied so as to indicate operability of a handling system.

17 Claims, 13 Drawing Sheets

DISCONNECT HOUSING FOR USE IN AUTOMATION SYSTEMS

CROSS REFERENCE TO RELATED APPLICATIONS

This application is a Continuation of copending U.S. patent application Ser. No. 13/700,576, filed Feb. 7, 2013, which is a U.S. nationalization under 35 U.S.C. § 371 of International Application No. PCT/US2011/038341, May 27, 2011, which claims the benefit of priority under 35 U.S.C. § 119(e) to U.S. provisional application No. 61/349,496, filed May 28, 2010. The disclosures set forth in the referenced applications are incorporated herein by reference in their entireties.

TECHNICAL FIELD

The present disclosure generally relates to a handling system for automation systems. More specifically, the present disclosure relates to a handling system that includes a disconnect housing for receiving a tooling boom in an automation system.

BACKGROUND

Automation systems are often used in manufacturing plants. For example, in the automobile industry, automation systems are used to control movement of various component parts in a manufacturing plant to position the component parts for various manufacturing operations. Such automation systems may utilize tooling booms that carry multiple tools, such as, for example, vacuum cups. The automation systems may include multiple tooling booms for each manufacturing plant.

One concern with the use of tooling booms is the tooling boom either not being properly seated within, or falling out of, a disconnect housing that is fixed to a robotic arm or the like. In either case, should the tooling boom fall out of the disconnect housing, the component parts and other equipment may become damaged, or someone may be injured.

Traditionally, the operator connects the tooling boom to the disconnect housing and actuates a handle to push a member against a portion of the tooling boom. In other words, the handle is turned until the operator “feels” that the tooling boom is frictionally retained within the disconnect housing. However, there is no mechanism that tells the user that the tooling boom is properly seated within the tooling boom and retained with an appropriate force.

Accordingly, there is a need for a system that includes disconnect housing that both senses when a tooling boom is present in the disconnect housing, and when such a tooling boom is properly retained within the disconnect housing. However, it is also understood that in automation systems where less than all of the tooling booms are required for a particular application, that a disconnect housing arrangement is needed that still permits operation of an automation system.

DESCRIPTION OF THE DRAWINGS

Embodiments of the present disclosure will now be described by way of example in greater detail with reference to the attached figures, in which.

DETAILED DESCRIPTION

Figure 1:
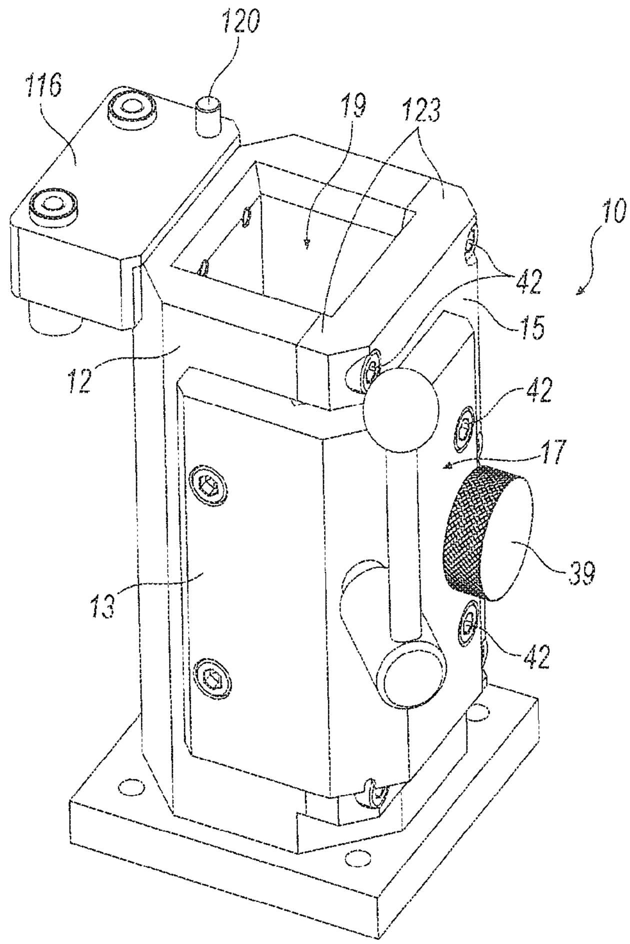
FIG. 1 is a perspective view of an exemplary disconnect housing for use in a straight path automation system.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description. The figures disclosed and described herein are illustrative examples of the appended claims, and are not intended to be limiting.

Referring to FIGS. 1-6, an exemplary disconnect housing 10 is illustrated. The disconnect housing includes a housing body 12, a cover 13, a cap member 15 and a handle assembly 17. The housing body 12 and cap member 15 are connected together and cooperate to form a channel 19 to receive a tooling boom 21. An exemplary tooling boom 21 is shown in FIG. 2A. Mounted to tooling boom 21, are one or more support bars 23. A cross clamp 25 is used to mount each support bar 23 to tooling boom 21. A swivel arm 25 may be used to mount a vacuum cup 27 and a venturi 29. An air supply line 31 is operably connected to venturi 29 to provided sufficient vacuum pressure to grip a work piece.

Figure 8:
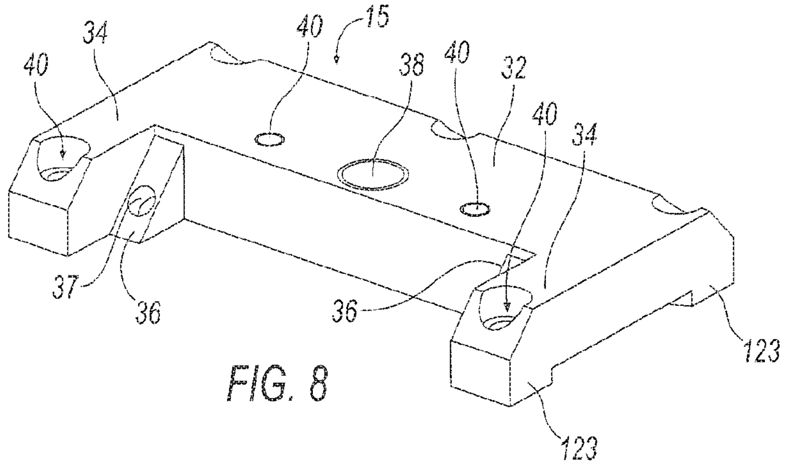
FIG. 8 is a perspective view of a cap of the disconnect housing.
Figure 9:
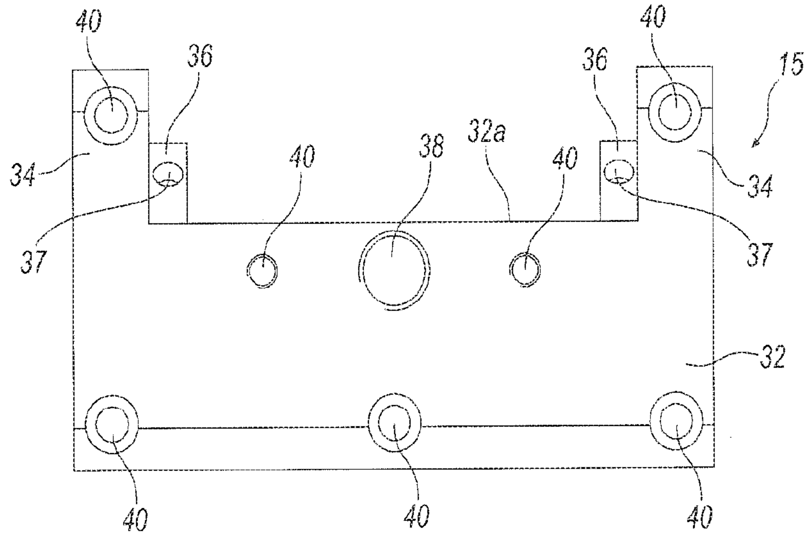
FIG. 9 is a top plan view of the cap of FIG. 8.
Figure 10:
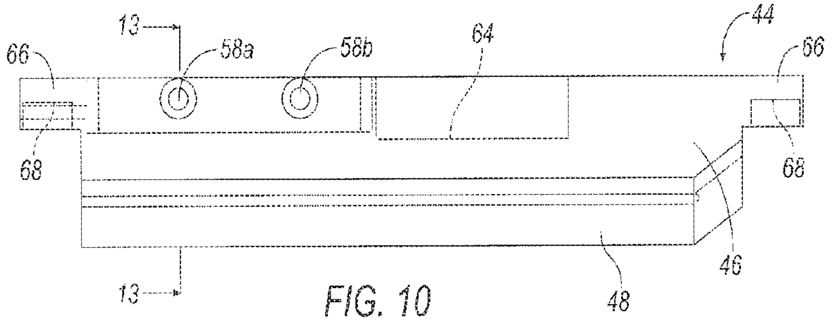
FIG. 10 is a side elevational view of a v-clamp of the disconnect housing.
Figure 11:
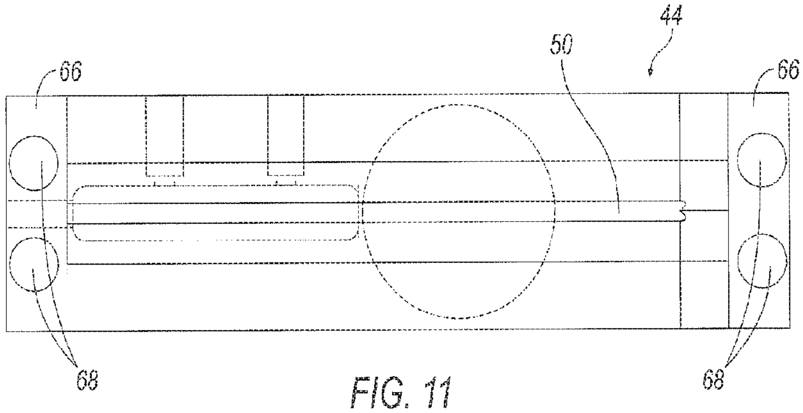
FIG. 11 is bottom plan view of the v-clamp of FIG. 10.
Figure 12:
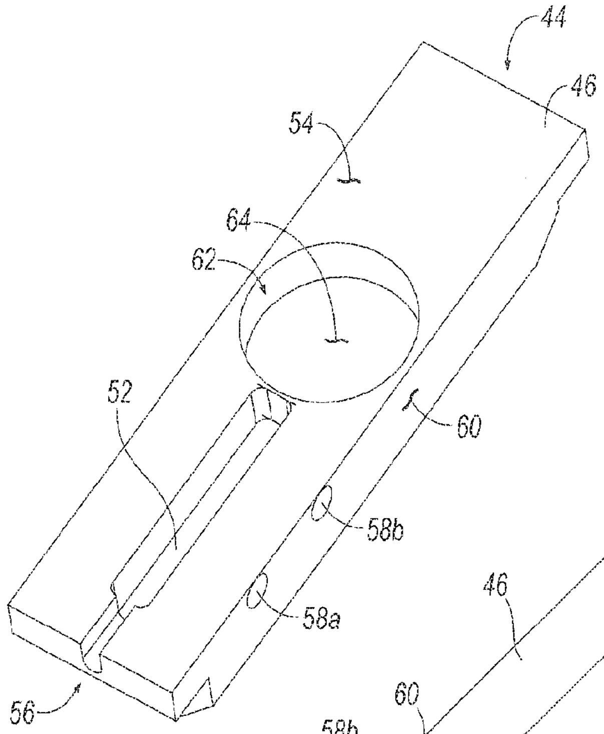
FIG. 12 is a top perspective view of the v-clamp of FIG. 10.
Figure 13:
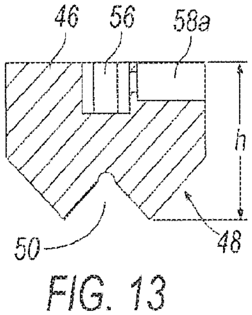
FIG. 13 is a cross-sectional view of the v-clamp of FIG. 10, taken along lines 13-13.
Figure 14:
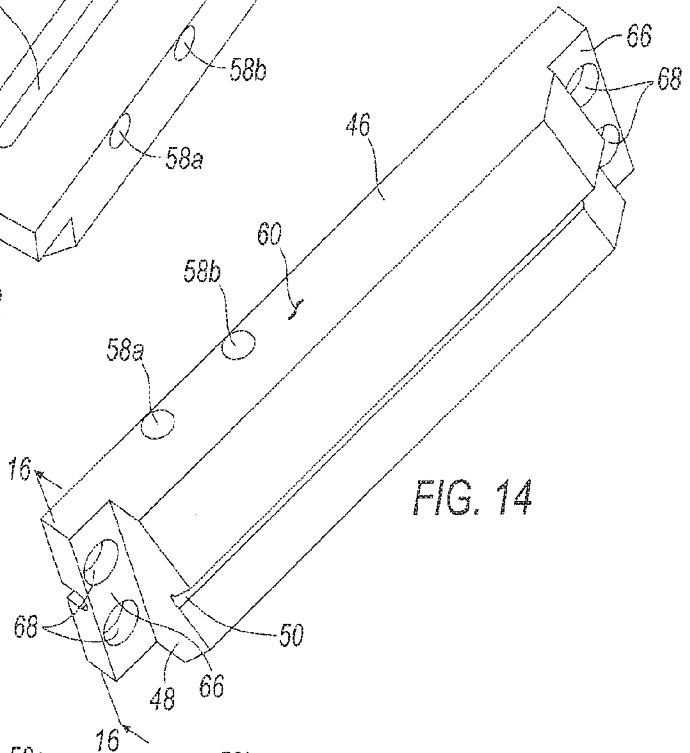
FIG. 14 is a bottom perspective view of the v-clamp of FIG. 10.
Figure 15:
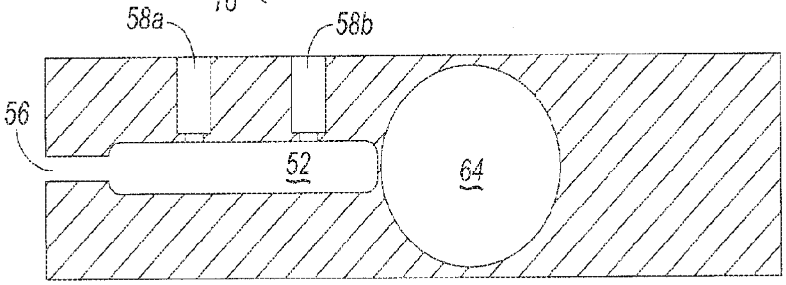
FIG. 15 is a cross-sectional view of the v-clamp of FIG. 14, taken along lines 15-15.

Turning now to FIGS. 8-9, details of cap member 15 will now be described. Cap member 15 comprises a body portion 32, opposing leg members 34, and spring mounts 36. Spring mounts 36 include spring mounting apertures 37. In one exemplary configuration, spring mounts 36 are extend outwardly from an inner edge 32*a* of body portion 32 and are configured to be angled downwardly. A mounting aperture 38 is formed through body portion 32. Mounting aperture 38 is configured to receive a safety pull pin 39 (see. e.g., FIG. 6). A plurality of connector apertures 40 are arranged in cap member 15. Connector apertures 40 cooperate with connector elements 42, such as screws, for example (best seen in FIG. 1).

Referring to FIGS. 10-16, a v-clamp 44 for use with disconnect housing 10 is illustrated. V-clamp 44 is defined by an upper body member 46 a lower member 48. Lower member 48 is generally v-shaped and defines a groove 50. A sensor mounting channel 52 is formed in a top surface 54 of upper body member 46. An opening 56 to mounting channel 52 provides for an electrical connection to the sensor (not shown) disposed within mounting channel 52. Additional openings 58*a*, 58*b* may also be provided on a side surface 60 of v-clamp 44 that open in to sensor mounting channel 52. Formed in top surface 54 is a spring mount 62. Spring mount 62 is configured with a predefined depth and further includes a mounting surface 64 that is spaced away from top surface 54 of upper body member 46.

On either end of upper body member 46 there are outwardly extending arm members 66. Arm members 66 are configured with spring mounts 68 that are configured to receive springs (to be discussed in further detail below).

Figure 16:
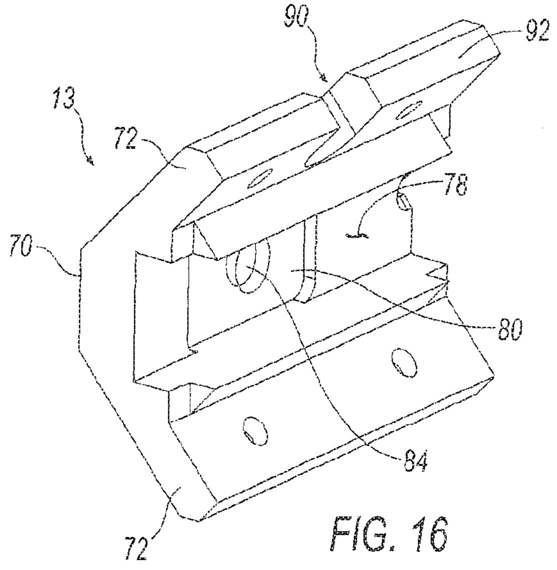
FIG. 16 is a perspective view of a cover of the disconnect housing of FIG. 1.
Figure 17:
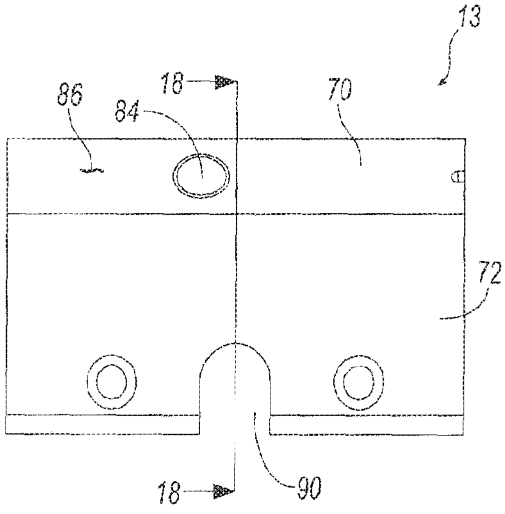
FIG. 17 is a side elevational view of the cover of FIG. 16.
Figure 18:
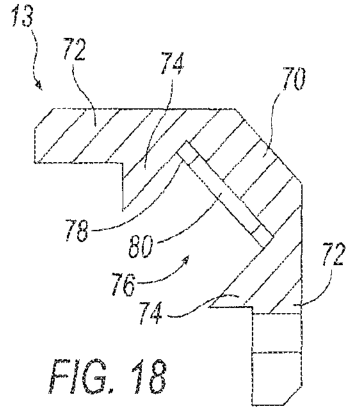
FIG. 18 is a cross-sectional view of the cover of FIG. 17, taken along lines 18-18.

Referring to FIGS. 16-18, cover 13 is illustrated. Cover 13 is configured with a center section 70 and generally opposing arms 72 that define an inwardly extending mounting surface 73. Arms 72 further include inwardly extending members 74 that extend from mounting surface 73. Extending members 74 cooperate to define a partial channel 76 (See, e.g., FIG. 18) that is configured to receive v-camp 44. On an inside surface 78 of cover 13, a sensor mounting groove 80 is formed. Mounting groove 80 is configured to receive a sensor plate 82 (best seen in FIGS. 20-22). An opening 84 is formed through a top surface 86 of cover 13. Opening 84 is configured to receive a rod 88 (best seen in FIG. 23), as will be explained below. A channel 90 is formed from a bottom edge 92 of one of arms 72. Channel 90 is configured to receive safety pull pin 39.

Figure 19:
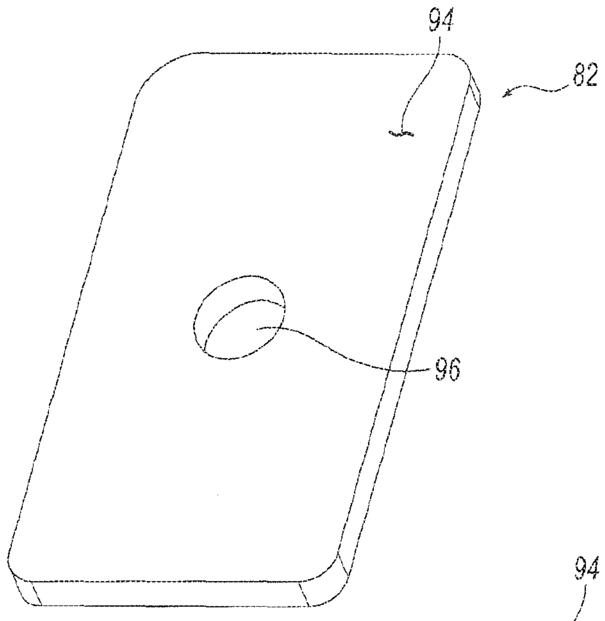
FIG. 19 is a perspective view of a sensor plate of the disconnect housing of FIG. 1.
Figure 20:
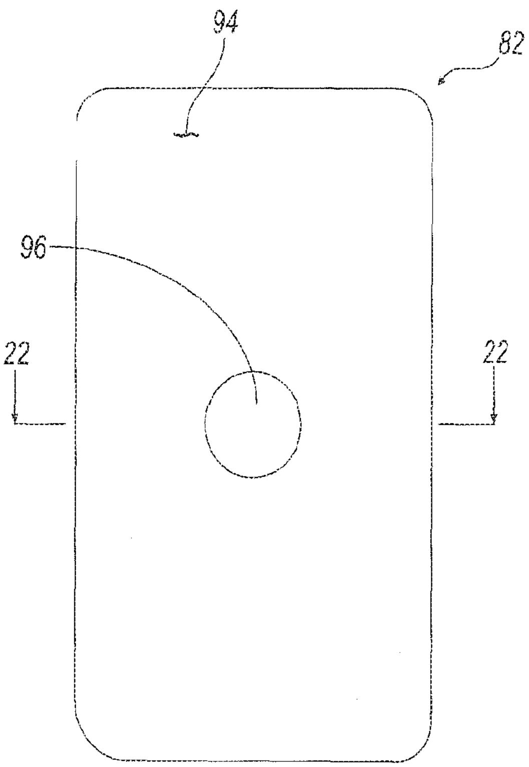
FIG. 20 is an elevational view of the sensor plate of FIG. 19.
Figure 21:
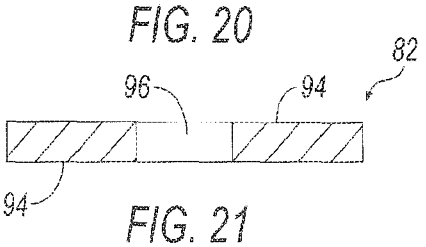
FIG. 21 is a cross-sectional view of the sensor plate of FIG. 20 taken along lines 21-21.

FIGS. 19-21 illustrate an exemplary sensor plate 82. Sensor plate 82 has generally opposing surfaces 94 and includes an opening 96 that is configured to receive a mounting head 98 of rod 88.

Figure 22:
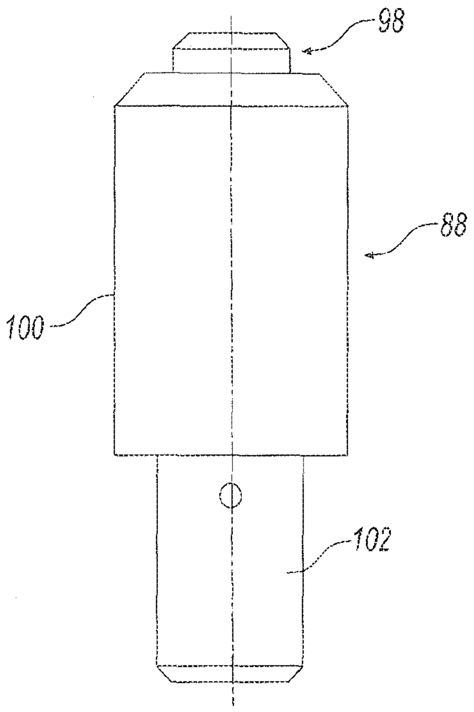
FIG. 22 is an elevational view of a rod of the disconnect housing of FIG. 1.
Figure 23:
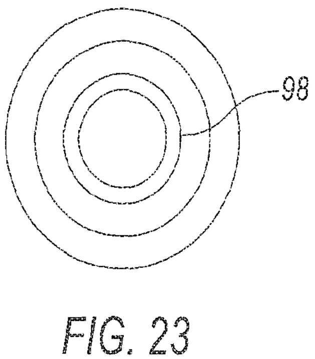
FIG. 23 is a top plan view of the rod of FIG. 22.

FIGS. 22-23 illustrate an exemplary rod 88. Rod 88 includes mounting head 98, a body portion 100 and a handle portion 102. As set forth above, mounting head 98 is received within opening 96 of sensor plate 82. Handle portion 102 is configured to connect handle 17.

Figure 24:
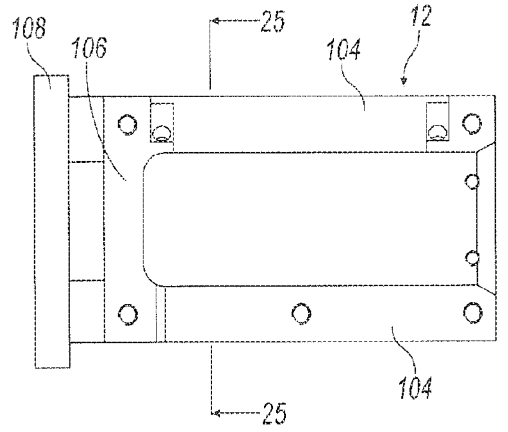
FIG. 24 is a top planar view of a housing body of the disconnect housing of FIG. 1.
Figure 25:
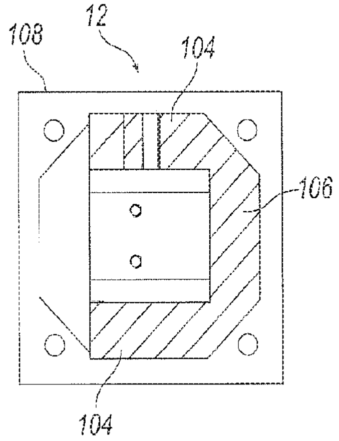
FIG. 25 is a cross-sectional view of the housing body of FIG. 24 taken along lines 25-25.

FIGS. 24-25 illustrate housing body 12. Housing body 12 is generally U-shaped defined by opposing wall members 104 and a transverse member 106. A supporting flange 108 may be secured to one end 16 of bracket member 12. Wall members 104 and transverse member 106 may be provided with connector openings 110 that are configured to secure cap member 15 to housing body 12 in any suitable manner. For example, in one embodiment, connector openings 110 may be threaded to receive a screw fastener. One of wall members 104 includes spring mounts 112 configured to receive springs (as will be explained below).

Figure 26:
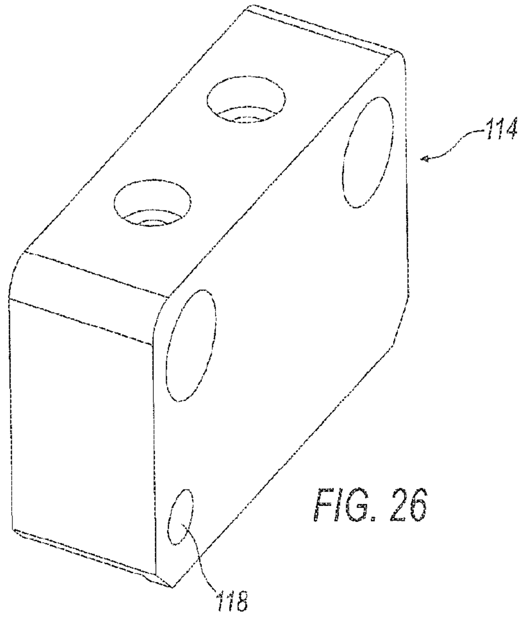
FIG. 26 is a perspective view of an air manifold and coding block of the disconnect housing of FIG. 1.

FIG. 26 is a perspective view of an air manifold and coding block 114. Block 114 secures to a mounting block 116. To insure that the correct tool boom is connected to disconnect housing 10, block 114 may be configured with a dowel aperture 118 in a predefined location that is designed to receive a mating dowel 120 in mounting block 116. If block 114 is provided with dowel aperture 118 in a location that fails to properly mate with a corresponding dowel 120 in mounting block 116, this indicates to the user that a different disconnect housing should be used.

Figure 27:
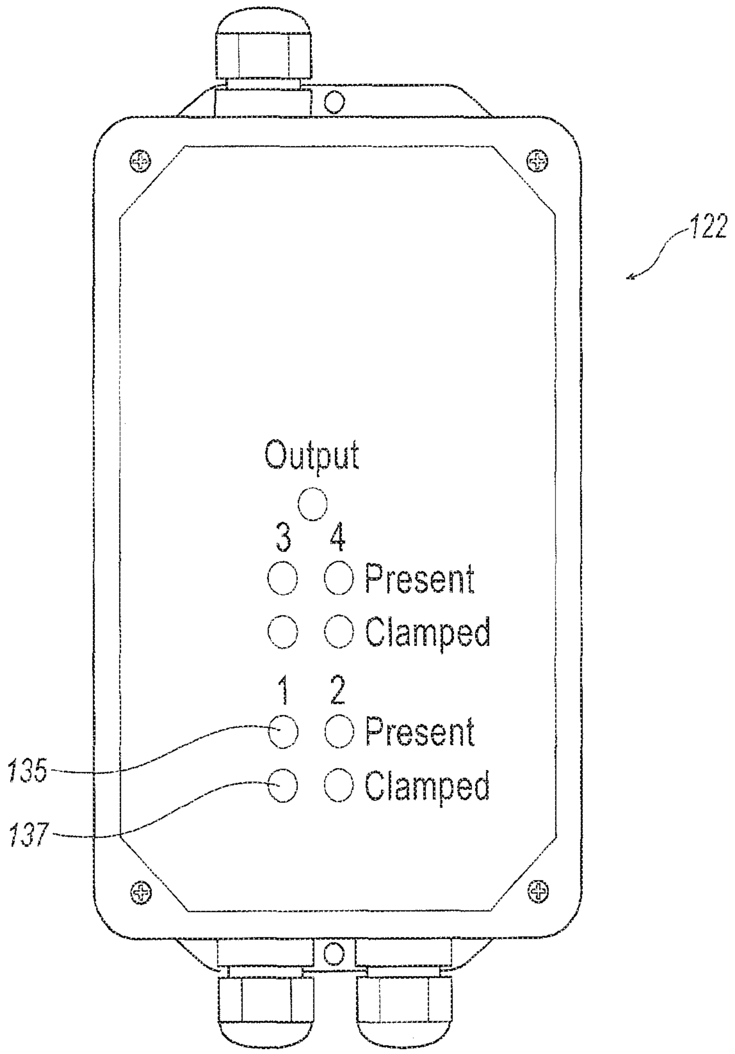
FIG. 27 is plan view of a sensor indicator used with the disconnect housing of FIG. 1.

FIG. 27 is an exemplary view of a sensor indicator 122 for use with four separate disconnect housings. Sensor indicator 122 includes an identification of tooling boom 14 in the automation system and an indication of whether a tooling boom 14 is present in disconnect housing 10, and whether tooling boom 14 is properly clamped.

Referring to FIGS. 3-7, the interaction of the various components described above of disconnect housing 10 will now be described. Cap 15 is fixedly secured to housing body 12. More specifically, leg members 123 mate with a top surface of opposing wall members 104 of housing body 12 and fasteners 42 are used to secure cap 15 to housing body 12 so as to create channel 19.

A "boom present" sensor mounting plate 124 is positioned within channel 19 of housing body 12, toward a closed end thereof. Sensor mounting plate 124, best seen in FIG. 6, further includes a sensor channel 126 into which a presence sensor 128 (see FIGS. 3, 5, and 7) is mounted.

V-clamp 44 is assembled to cover 13 such that top surface 54 of upper body member 46 is positioned so as to face inside surface 78 of cover 13. A plurality of disc springs 124, such as Bellville disc springs, (best seen in FIGS. 4-5) are positioned on mounting surface 64 in spring mount 62. Springs 124 are selected that require a predetermined amount of force to collapse, as will be explained in further detail below. Additional biasing springs 130 are positioned spring mounts 68 formed in arm members 66 of v-clamp 44.

Sensor plate 82 is positioned within mounting groove 80 of cover 13 and is operatively connected to a load sensor 132 that is positioned within sensor mounting channel 52 in v-clamp 44. V-clamp 44 is positioned within partial channel 76 such that disc springs 124, sensor plate 82 and load sensor 132 are captured between v-clamp 44 and cover 13. Connecting rod 88 is positioned through opening 84 in top surface 86 of cover 13 and mounting head 98 is engaged with opening 96 of sensor plate 82. In an exemplary configuration, body portion 100 of connecting rod 88 is threaded and cooperates with mating threads disposed within opening 84, as will be explained below in greater detail.

Figure 2A:
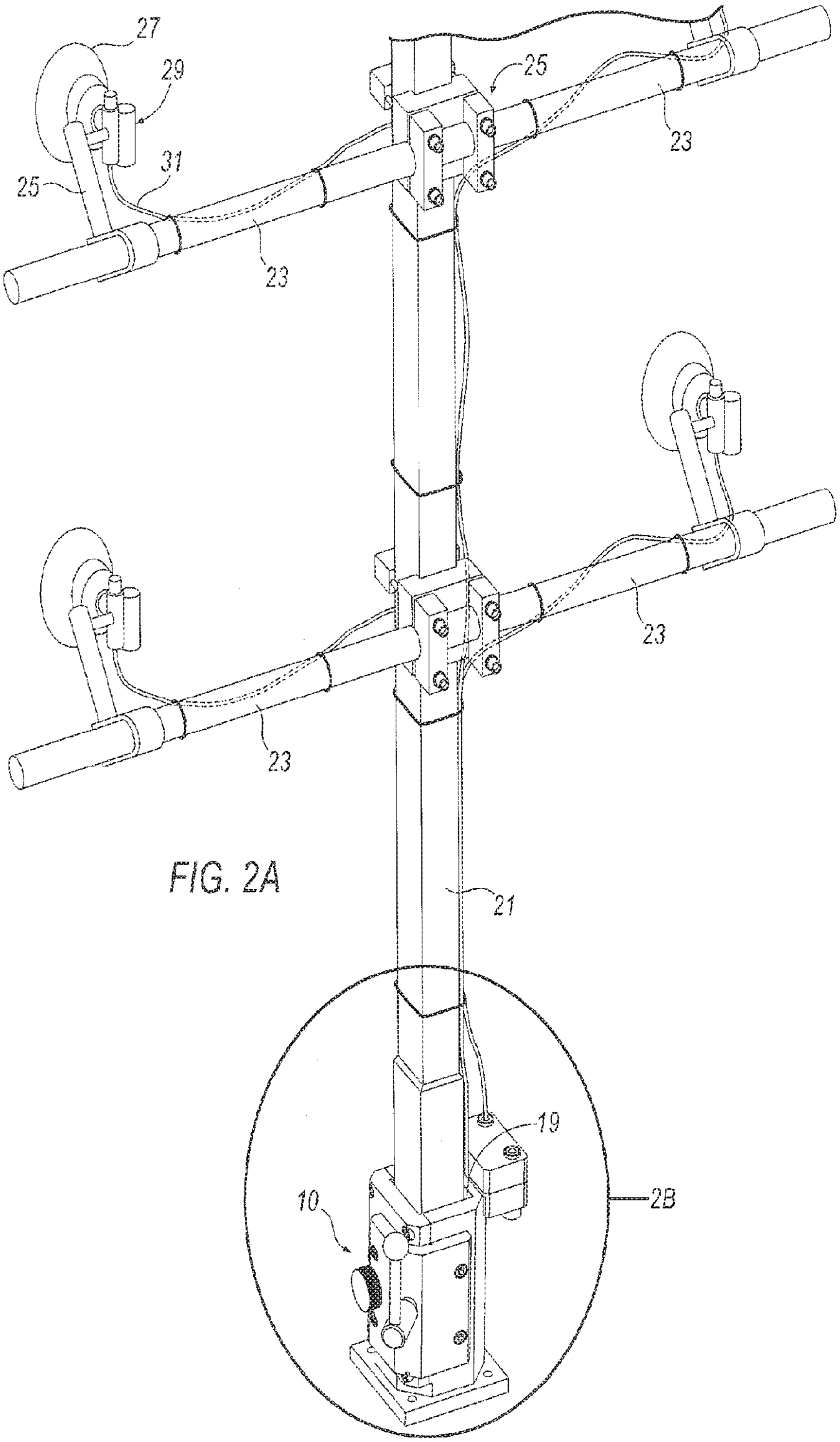
FIG. 2A is a perspective view of an exemplary tooling boom mounted in the disconnect housing of FIG. 1.
Figure 2B:
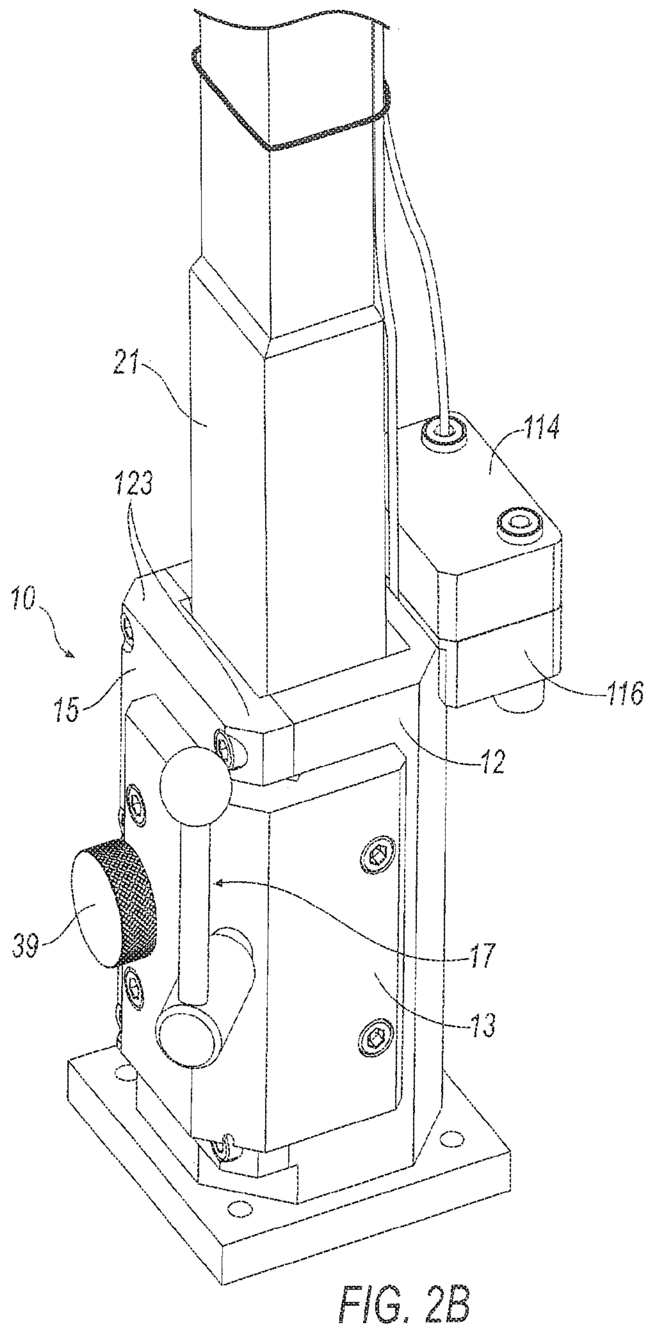
FIG. 2B is an enlarged perspective view of encircled area 2B of FIG. 2A. an end view of the disconnect housing of FIG. 1.
Figure 3:
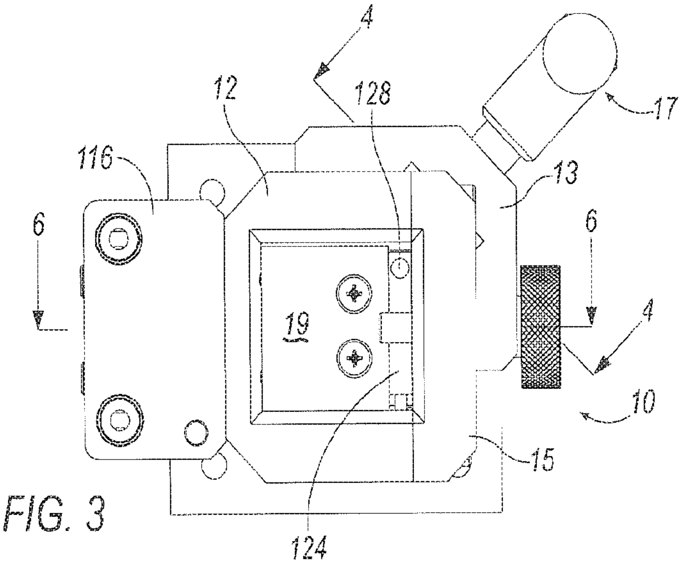
FIG. 3 is an end view of the disconnect housing of FIG. 1.
Figure 4:
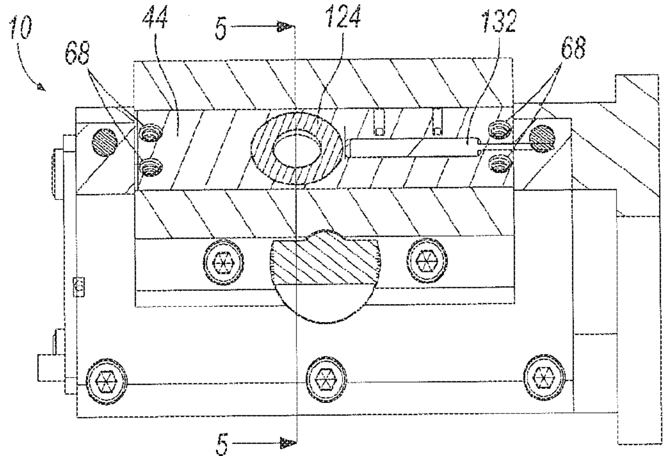
FIG. 4 is a cross-sectional view of the disconnect housing of FIG. 3, taken along lines 4-4.
Figure 5:
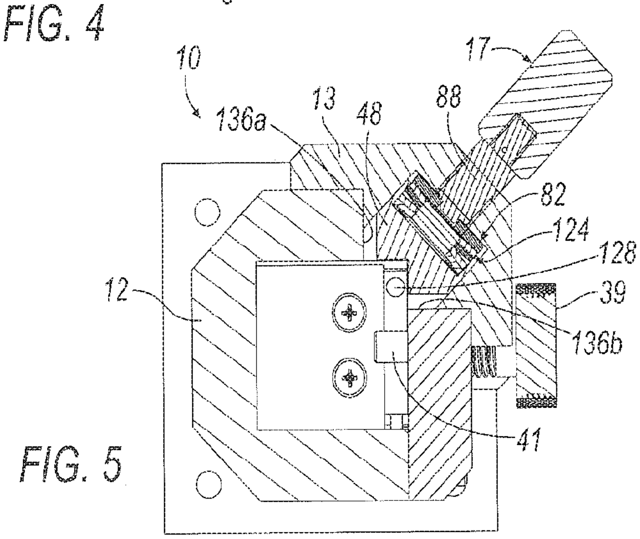
FIG. 5 is a cross-sectional view of the disconnect housing of FIG. 4, taken along lines 5-5.

Once v-clamp 48, disc springs 124, biasing springs 130, sensor plate 82 and load sensor 132 are assembled together, cover 13 is fixedly secured to housing body 12 and cap member 15, as shown in FIGS. 1-2. As may be seen, v-clamp 48 is configured with a height h (see FIG. 13) that is less than a depth of partial channel 76 when the v-clamp 48 is in the assembled position. Handle assembly 17 secured to handle portion 102 of connecting rod 88.

Air manifold and coding block 114 is attached to mounting block 116. More specifically, dowel 120 is received within dowel aperture 118.

In operation, an end of tooling boom 21 is inserted into channel 19 of disconnect housing 10. Because sensor 128 is positioned at the rear of channel 19, when tooling boom 21 is placed in channel 19, sensor 128 sends a signal to sensor indicator 122 to indicate that tooling boom 21 is "present." For example, if disconnect housing 10 is programmed as housing "1", then a light 135 (such as an LED) will illuminate under "1" and adjacent to the "Present" indicator.

Once tooling boom 21 is seated within channel 19, an operator actuates handle assembly 17. Turning handle assembly 17 causes connector rod 88 to move inwardly toward a center of disconnect housing 10, thereby moving v-clamp 44 inwardly toward the center of disconnect housing 10 a predetermined distance until sections of lower member 48 of v-clamp 44 that defines groove 50 contact engagement surfaces 136*a* and 136*b* (best seen in FIG. 5) disposed on a portion of housing body 12 and cover 13. Once, v-clamp 44 is in contact with engagement surfaces 136*a*, 136*b*, further actuation of handle assembly 17 moves sensor plate 82 toward the center of disconnect housing 10, thereby causing disc springs 124 and biasing springs 130 to compress. After a predetermined amount of force is applied by handle assembly 17, disc springs 124 will bottom out in spring mount 62 of v-clamp 44. When this action happens, sensor plate 82 will come into contact with load sensor 132 that is disposed in sensor mounting channel 52. A signal will then be sent to sensor indicator 122 to indicate that tooling boom 21 is in the "clamped" position. For example, if disconnect housing 10 is programmed as housing "1", then a light 137 (such as an LED) will illuminate under "1" and adjacent to the "Clamped" indicator.

In other words, once a threshold force has been reached, the automation system is set to operate. More specifically, if sensor plate 82 does not contact load sensor 132, and if presence sensor 128 fails to indicate the presence of tooling boom 21, the system will not operate so as to prevent operation of automated systems wherein tooling booms 21 that are not fully secured within housing 10. Thus, the block member 32 and sensor 38 arrangement serves as a confirmation that the boom is both present and properly seated within housing 10.

Figure 6:
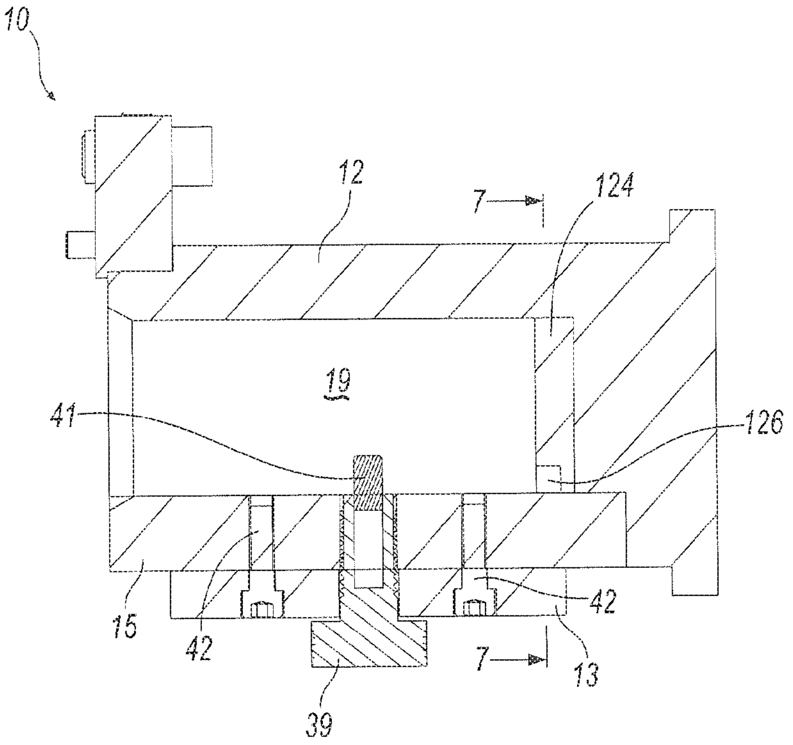
FIG. 6 is a cross-sectional view of the disconnect housing of FIG. 3, taken along lines 6-6.
Figure 7:
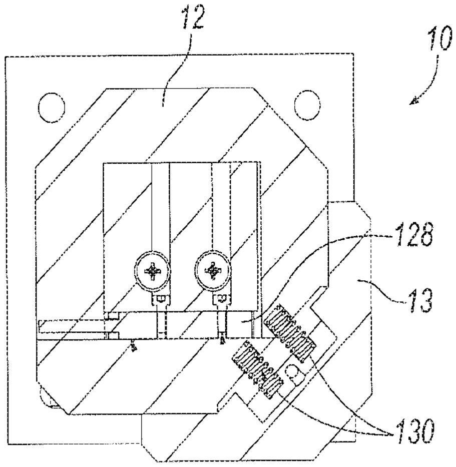
FIG. 7 is a cross-sectional view of the disconnect housing of FIG. 6, taken along lines 7-7.

As an additional safety mechanism, once tooling boom 21 is properly seated and clamped within disconnect housing 10, safety pull pin 39 is positioned through channel 90 of cover 13 and disposed within mounting aperture 38 of cap member 15, as may be seen best in FIG. 6. Safety pull pin 39 includes a plunger 41 that is biased outwardly of an end portion of safety pull pin 39. Plunger 41 is configured to be received within a mating aperture (not shown) in tooling boom 21 when tooling boom 21 is properly seated within disconnect housing 10.

In some automation configurations, there may be arrangements for a capacity of multiple tooling booms 21. However, in some instances only a limited number of tooling booms may be required for a particular application. For example in a body shop set-up having 4 tooling boom arrangements, only 2 booms may be needed. However, rather than requiring reprogramming of sensor indicator 122, the configuration of disconnect housing 10 permits handle assembly 17 to be actuated so as to move v-clamp 44 into the clamped position, even if no tooling boom 21 is present. Accordingly, because v-clamp 44 moves inwardly toward a center of housing body 12, v-clamp 44 moves over presence sensor 128 such that sensor indicator 122 indicates that a tooling boom 21 is present, even though there is not one present. Further, actuation of handle assembly 17 will still permit disc springs 124 to collapse upon application of the appropriate amount of force such that sensor plate 82 will contact load sensor 132. Such an action will cause a signal to be sent that indicates a "clamped" condition of disconnect housing 10. Accordingly, operation of the automation system will still be permitted, even if less than all tooling booms 21 are utilized.

The appended claims have been particularly shown and described with reference to the foregoing embodiments, which are merely illustrative of the best modes for carrying out the invention defined by the appended claims. It should be understood by those skilled in the art that various alternatives to the embodiments described herein may be employed in practicing the invention defined by the appended claims without departing from the spirit and scope of the invention as defined in claims. The embodiments should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain embodiments and should in no way be construed to limit the appended claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What I claim:

1. A disconnect housing assembly for selectively receiving a tooling boom, comprising:

a housing comprising a housing body defining a longitudinally extending channel therein having an open end for receiving a tooling boom;
a cover configured to be attached to the housing on a longitudinally extending side of the housing body;
a presence sensor for sensing the presence of the tooling boom, the presence sensor disposed and mounted at a location within the channel;
a clamp member transversely extending through the cover, received by the channel and engageable with the tooling boom, the clamp member being moveably mounted to the cover and the housing;
a biasing assembly having a predetermined force threshold operatively connected to the clamp member; and
a load sensor assembly operatively connected to the biasing assembly;
wherein the biasing assembly is configured for selective actuation that moves the clamp member within the channel toward an interior of housing body by a predetermined amount for engaging the tooling boom and to activate the presence sensor when the tooling boom is positioned within the channel at a location corresponding to the location of the presence sensor within the channel to send a presence signal indicating a presence condition of the tooling boom and wherein, upon application of the threshold force, the biasing assembly collapses so as to cause engagement of the tooling boom and to activate the bad sensor assembly to send a signal indicating that the clamp member is engaged with the tooling boom.

2. The disconnect housing assembly of claim 1 further including a sensor indicator, the presence sensor configured to send the presence signal to the sensor indicator to indicate that the tooling boom is at the location within the channel.

3. The disconnect housing assembly of claim 2, wherein the presence sensor is received by the channel of the housing.

4. The disconnect housing assembly of claim 3, wherein the presence sensor is mounted to the housing.

5. The disconnect housing assembly of claim 2, wherein the sensor indicator is outside of the channel.

6. The disconnect housing assembly of claim 1, wherein the housing further comprises a cap member fixedly secured to the housing body, wherein the housing body further comprises opposing side wall members and a transverse member that cooperate to define a generally U-shaped cross-section.

7. The disconnect housing assembly of claim 6 wherein the cap member comprises a body portion and outwardly extending, opposing leg members.

8. The disconnect housing assembly of claim 1, wherein the clamp member comprises an upper portion and a lower portion, wherein the upper portion defines a spring mount for receiving a portion of the biasing assembly and wherein the lower portion defines a groove configured to be selectively disposed around a portion of a tooling boom.

9. The disconnect housing assembly of claim 8, wherein the upper portion further comprises a sensor mounting channel configured to receive a load sensor.

10. The disconnect housing assembly of claim 1, wherein the load sensor assembly comprises a sensor plate and a load sensor, wherein the sensor plate is movably mounted within the disconnect housing assembly for selective contact with the load sensor.

11. The disconnect housing assembly of claim 1, wherein the cover is configured to be attached to the housing such that the clamp member is captured between a portion of the housing and the cover.

12. The disconnect housing assembly of claim 11, wherein the cover further comprises a center section and opposing arms attached thereto, wherein the opposing arms further comprise inwardly extending members that define a partial channel that is configured to receive the clamp member therein.

13. The disconnect housing assembly of claim 12, wherein an inside surface of the center section of the cover further includes a mounting groove configured to receive a sensor plate of the load sensor assembly and wherein the sensor plate is positioned between an upper portion of the clamp member and the inside surface of the cover.

14. The disconnect housing assembly of claim 1, wherein the biasing assembly further comprises a disc spring having a predetermined load threshold.

15. The disconnect housing assembly of claim 1, further comprising a presence sensor plate disposed in the channel of the housing, the presence sensor plate configured with a sensor channel therein, and wherein the presence sensor is disposed within the sensor channel.

16. The disconnect housing assembly of claim 1, further comprising a handle assembly operatively connected to the clamp member, wherein actuation of the handle assembly moves the clamp member within the channel.

17. The disconnect housing assembly of claim 16, wherein the handle assembly further comprises a connector rod comprising a mounting head, wherein the mounting head is received within an opening formed in a sensor plate that is configured to press against biasing assembly.

* * * * *